United States Patent [19]

Van Gompel

[11] 4,141,117

[45] Feb. 27, 1979

[54] RELEASING TOOL FOR USE WITH A RELEASABLE CONE LOCK

[75] Inventor: James J. Van Gompel, Fremont, Ind.

[73] Assignee: Brammall, Inc., Angola, Ind.

[21] Appl. No.: 804,935

[22] Filed: Jun. 9, 1977

[51] Int. Cl.² ............................................. F16G 11/00
[52] U.S. Cl. .............................. 24/136 R; 24/136 A; 24/263 SW; 403/374
[58] Field of Search .................. 24/136, 265, 263 SW, 24/244, 136 B, 115 L; 403/374, 373, 12

[56] References Cited

U.S. PATENT DOCUMENTS

| 1,829,760 | 11/1931 | Santiago | 24/136 A |
| 2,372,754 | 4/1945 | Wickes | 24/136 K |
| 2,514,760 | 7/1950 | Hansen et al. | 24/136 A |
| 3,220,743 | 11/1965 | Knapp | 24/136 R |
| 3,785,296 | 1/1974 | Berry et al. | 24/136 R |
| 3,998,167 | 12/1976 | Van Gompel | 24/136 A |

FOREIGN PATENT DOCUMENTS

| 282996 | 10/1913 | Fed. Rep. of Germany | 24/136 A |
| 590310 | 6/1925 | France | 24/136 R |
| 276525 | 9/1927 | United Kingdom | 24/136 R |
| 482984 | 4/1938 | United Kingdom | 24/136 R |

Primary Examiner—Victor N. Sakran
Attorney, Agent, or Firm—Hill, Gross, Simpson, Van Santen, Steadman, Chiara & Simpson

[57] ABSTRACT

A tool for releasing cone locks which can generally be moved in only a single direction on a cable or rod wherein the tool is provided with a portion that can be inserted into the lock to engage and release the locking mechanism such that the lock can be removed from the cable or rod thus preventing the rod and cable from having to be cut.

2 Claims, 9 Drawing Figures

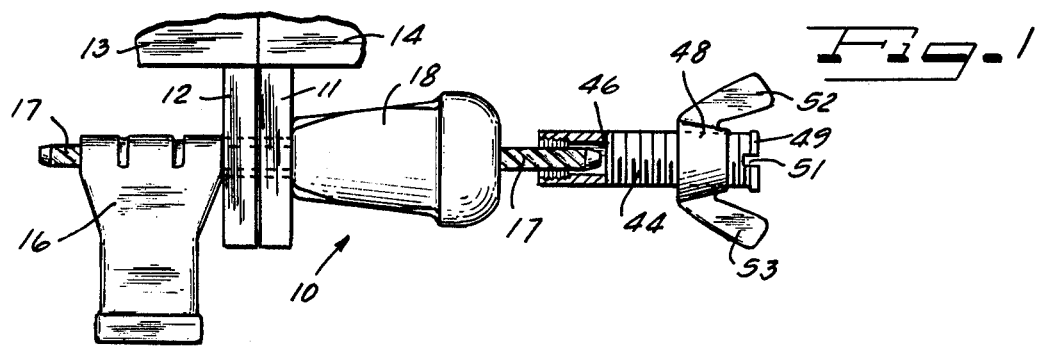
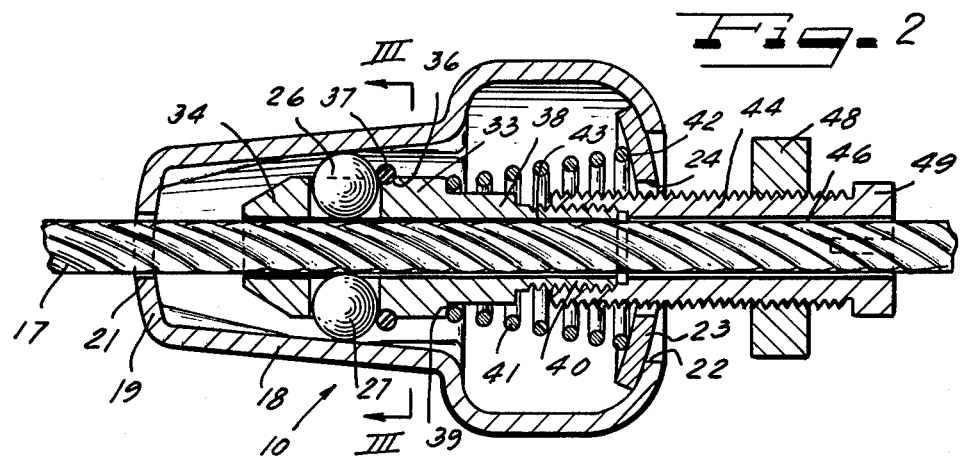
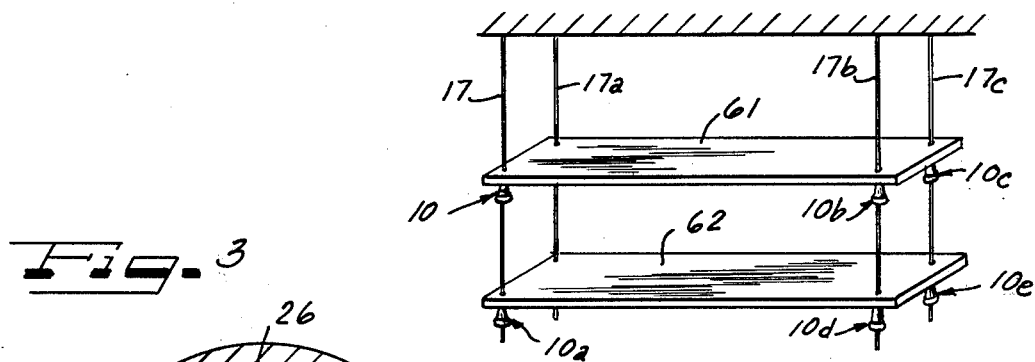
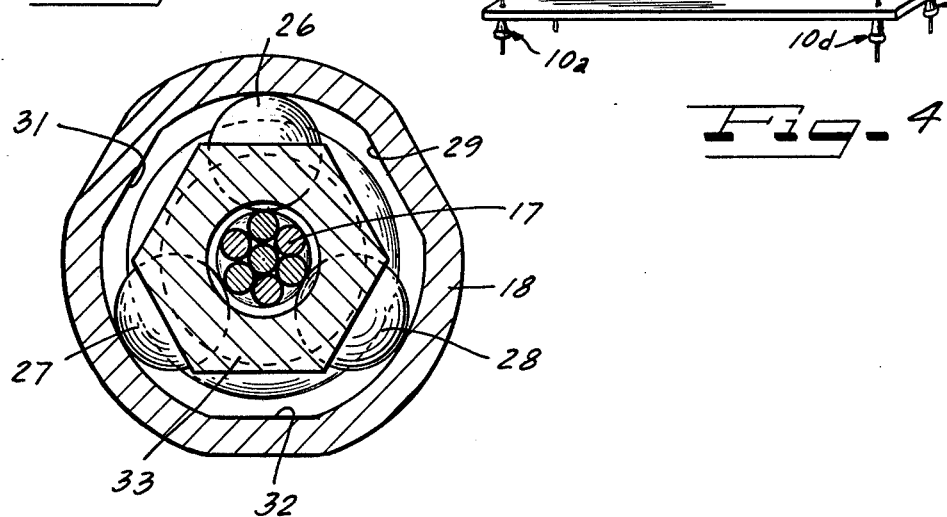

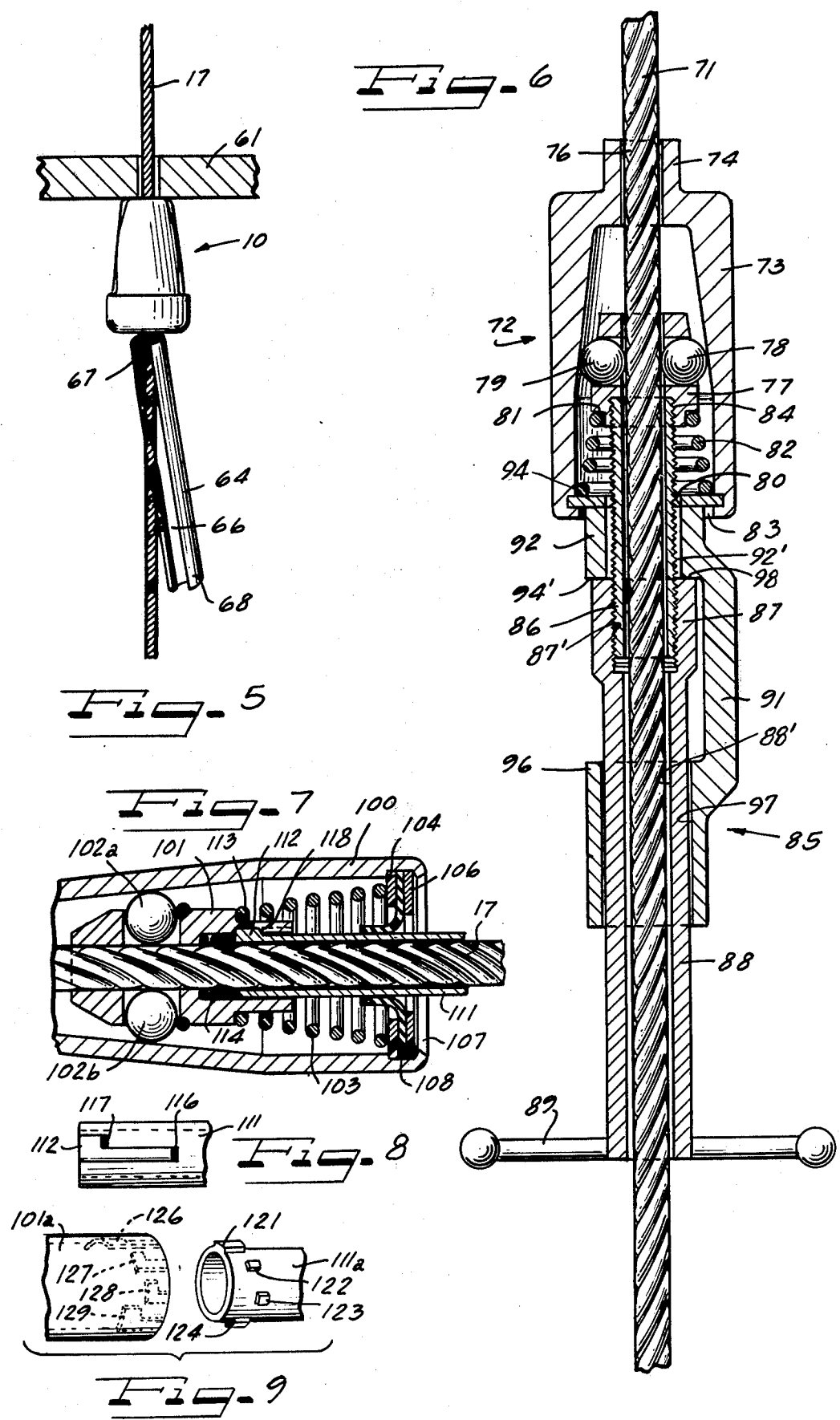

RELEASING TOOL FOR USE WITH A RELEASABLE CONE LOCK

BACKGROUND OF THE INVENTION

1. Field of the Invention

The present invention relates to lock releasing means and in particular to tools for selectively releasing unidirectional cone locks.

2. Description of the Prior Art

The present inventor has obtained U.S. Pat. Nos. 3,998,167 and 3,994,521 which disclose cone locking means in which a plurality of balls are supported in a retainer in a cone shaped lock such that when a cable or rod passes through the lock it can be freely moved in one direction but when attempts are made to withdraw it in the opposite direction the balls ride down an inclined surface and are forced into the cable or rod to lock it from movement in the second direction. A spring biases the retainer and balls down the inclined surface such that the balls tend to lock the cable and rods. In such prior art devices, it is necessary to cut the cable or rod to remove the lock.

SUMMARY OF THE INVENTION

The present invention relates to a releasable cone lock in which a generally cylindrical shaped releasing tool is inserted into one end of the lock to engage the ball retainer to allow it to be moved in a direction such that the balls move up the internal cam surface away from the cable such that the cable can move through the cone lock without being compressed and locked by the balls. One embodiment of the invention comprises a threaded shaft which can be extended into the cone lock and is engageable with the ball retainer such that the ball retainer can be moved against its holding spring to release the cable. In this embodiment, a threaded nut which may be of a wing nut form can be used to exert releasing force on the retainer.

Another form of the releasing mechanism comprises a hollow sleeve shaped threaded shaft that can be inserted into the cone lock so as to engage the retainer and allow it to be pulled in a direction such that the cable is released.

A third embodiment of the invention includes a handle portion which has an engaging portion that can be threaded into the retainer to move it to the unlocked position.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 1 illustrates the releasing tool of the invention;

FIG. 2 is a sectional view illustrating the releasing tool;

FIG. 3 is a sectional view taken on line III—III in FIG. 2;

FIG. 4 illustrates a plurality of cone locks used to support shelving;

FIG. 5 illustrates a modification of the invention;

FIG. 6 is a sectional view through a further modification of the invention;

FIG. 7 is a sectional view illustrating a modification;

FIG. 8 is a detailed view of the keyway means of FIG. 7; and

FIG. 9 illustrates a further embodiment.

DESCRIPTION OF THE PREFERRED EMBODIMENTS

FIGS. 1, 2 and 3 illustrate the cone lock of the invention designated generally as 10 which has a main body portion 18 formed with openings 21 at its first end 19 and 24 at its second end through which a cable or rod 17 can be inserted. A ball retainer 33 is mounted inside the cone lock 10 and is formed with openings for receiving a plurality of balls 26, 27 and 28. An O-ring 37 of rubber or other suitable material is mounted in a groove 36 in the retainer 33 for retaining the balls 26, 27 and 28 in the retainer 33. A spring 43 is mounted between a shoulder 39 formed on the retainer 33 and an end member 23 so as to bias the retainer 33 to the left relative to FIG. 2. As shown in FIGS. 2 and 3, the balls 26, 27 and 28 are biased by the spring 43 down incline planes so that the balls move closer to each other and lock the cone lock to the cable 17. As shown in FIG. 3, portions 29, 31 and 32 of the cone lock body 18 near the end 19 are flattened so as to inhibit the balls from rolling around in the cone lock.

In the present invention, an extension 38 is formed on the retainer 33 adjacent the end 22 of the cone lock and a portion 40 is externally threaded and extends from the portion 38 of the ball retainer 33 toward the end 22. An internally threaded sleeve 44 has a central opening 46 which can be passed over the end of the cable 17 extending from the cone lock and can be inserted through the opening 24 of the cone lock. The sleeve 44 can be rotated so that its internally threaded portion can engage the threads 40 of the extending portion 43. The sleeve 44 can then be moved to the right relative to FIGS. 1 and 2 which will pull the ball retainer 33 to the right allowing the balls 26, 27 and 28 to move up the cam surfaces of portion 18, thus, releasing tension on the cable 17 so that the cable can be moved to the left relative to FIGS. 1 and 2 out of the cone lock.

If desired, a nut 48 such as a wing nut having wings 52 and 53 illustrating in FIG. 1 can be threadedly receives on the external surface of sleeve 44. The end 49 of the sleeve 44 may be enlarged so that the nut 44 cannot be removed from the sleeve and a slot for a screw driver designated by 51 may be formed in the end of the sleeve 49.

In use, shelving such as illustrated in FIG. 4 can be supported by cone locks 10, 10a, 10b, 10c, 10d and 10e by attaching a plurality of cables 17, 17a, 17b and 17c to a supporting ceiling 25 and passing the cables through openings formed in a shelf 61. The cone locks 10, 10b and 10c can be inserted over the lower ends of the cables and the cone locks moved to locking positions to support the shelf 61. Then a second shelf 62 formed with aligned openings can be received on the cables 17, 17a, 17b and 17c and additional cone locks 10a, 10d and 10e can be placed over the lower ends of the cables to support the shelf 62.

When the end of the cable or rod is not accessable due to an obstruction, such as the shelving structure illustrated in FIG. 4, and it is desirable to lower the shelf 61, cone locks 10, 10b and 10c must be released and lowered on the cables between the shelf 61 and 62. For this purpose a sleeve 64 is provided which has an opening 66 so that it can be fitted onto the cable 17 from the side. The inner surface 67 of the sleeve 64 is threaded so that it can be threaded onto portion 40 of the retainer 33 and when the sleeve 64 is pulled downwardly relative to FIG. 5, the cone lock 10 will be unlocked from the cable 17 so that the cone lock 10 can be moved downwardly. If desired, for gripping purposes, the external surface of the sleeve 64 may be threaded or knurled.

FIG. 6 illustrates a modification of the invention including a relatively larger cone lock 73 through which a rod or cable 71 extends through a sleeve portion 74 formed with a central opening 76 and in which a retainer 77 is mounted with locking balls 78 and 79. A spring 82 engages a shoulder 81 of the ball retainer 77 to bias it upward relative to FIG. 6 and the spring 2 bears against an end plate 83 which is formed with a central opening through which the cable or rod 71 extend.

A releasing tool 85 has a threaded shaft 86, a cylindrical collar 87 with a threaded internal boring 87' affixed to one end of a cylindrical handle portion 88. The cylindrical handle portion 88 has an axial boring 88' therethrough and a transverse handle 89 mounted at the other end thereof. The internal threads 87' of the collar 87 can threadedly engage the threaded shaft 86.

A longitudinal member 91 is connected to a first sleeve 92 which is received against the end plate 83 about the rod or cable 71. The first sleeve 92 has an axial boring 92', a first end surface 94 and a second end surface 94' which are essentially perpendicular to the axial boring 92'. A second sleeve 96 is affixed to the longitudinal member 91 and has an axial boring 97 therethrough. The collar 87 has a collar surface 98 which bears against the second end surface 94' of the first sleeve 92. When the tool 85 is assembled, the axial borings 87', 88', 92', and 97 all have a common center line. After the threaded portion 86 has been threadedly engaged with collar 87, the handle 89 can be rotated for further withdrawal of the ball retainer downwardly, releasing the balls 78 and 79 from their locking relationship with the cable or rod 71 so that the cone lock 73 can be moved downwardly relative to FIG. 6.

The threaded portion 86 may also be integrally formed with the retainer 77 and extend from the cone lock 72 so that it can be threaded to collar 87 to move the retainer down to unlock it.

It is seen that the tools of the present invention allow cone locks to be adjusted and removed without destroying the integrity of the lock.

In addition to using a threaded member such as the member 64 or the tool 85, male and female key structures can be used for moving the member to release it.

FIGS. 7, 8 and 9 illustrate embodiments illustrating keys.

In FIG. 7, the cylindrical housing 100 includes the ball retainer 101 which holds the balls 102a and 102b and the retainer is spring biased by spring 103 to lock the balls 102 on the cable 17. A pair of washers 104 and 106 are mounted at the end 107 of the housing 100 and a rubber seal 108 completely closes the opening through which the cable 17 extends, keeping out sand, rain and sleet. A key 111 can be extended into the housing and through the seal 108 and has a projecting key portion 112 receivable in mating keyways 113 formed in the ball retainer 101. A spring 114 is mounted in the central opening of the ball retainer 101 to provide protection of the device from picking. As shown in FIG. 8, the key 111 has tapered surfaces 116 and 117 on the protruding portion 112 and the female keyway has mating tapered portions 118 as shown in FIG. 7, which deflect any probes used in attempting to pick the lock. It is to be realized, of course, that more than one male and female portions may be used to obtain multiple key combinations, as well as by varying the dimensions of the male and female parts. They may also vary so that the keys themselves are not interchangeable.

FIG. 9 illustrates a modified form of a key 111a which has a plurality of key portions 121, 122, 123 and 124 which can be extended into mating females keyway portions 126, 127, 128 and 129 and rotated so as to attach the key 111a to the ball retainer 101 so it can be unlocked from the cable 117.

Although the invention has been described with respect to preferred embodiments, it is not to be so limited as changes and modifications may be made therein which are within the full intended scope as defined by the appended claims.

I claim as my invention:

1. A removable release tool for use with a cone lock; the cone lock having a hollow body member closed by an end plate with a centered opening with a cable receivable therethrough and a spring biased movable retainer mounted in the body member operable to permit the cone lock to slide in a first direction with respect to the cable received therethrough and operable to block the cone lock from sliding opposite to the first direction, an engaging means being mounted on the spring biased movable retainer and accessible through the centered opening of the end plate;

the removable release tool comprising: a hollow shaft with a threaded external surface;

a cylindrical handle portion having an axial bore therethrough with a handle mounted transversely thereto at a first end, with a collar affixed at a second end, said collar having a threaded internal boring sharing a common center line with said axial boring through said handle portion;

a first and a second sleeve each having an axial boring therethrough joined by a longitudinal portion with said first sleeve having a first and a second end surface, said first and said second sleeves being joined by said longitudinal portion so as to have a common center line with respect to said interior borings with said first and said second end surfaces being substantially perpendicular thereto;

said cylindrical handle portion being rotatably mounted within said axial boring of said second sleeve with said collar surface being positioned adjacent to said second end surface of said first sleeve;

said hollow shaft being threaded into said threaded internal boring in said collar of said cylindrical handle portion and passing through said boring in said first sleeve;

whereby the cone lock may be released by positioning the cable clamped by the cone lock within said axial boring of said cylindrical handle portion and within said hollow shaft with said first end surface of said first sleeve adjacent to the end plate, said threads of said hollow shaft engaging the spring biased movable retainer within the cone lock and the spring biased movable retainer being moved opposite to the first direction, thereby releasing the cone lock, by the rotation of said cylindrical handle portion which threadably engages said hollow shaft causing said hollow shaft to move opposite to the first direction while said collar surface of said cylindrical handle portion bears against said second end surface of said first sleeve and said second end surface of said first sleeve bears against the end plate of the cone lock.

2. A removable release tool for use with a cone lock; the cone lock having a hollow body member with a centered opening with a cable receivable therethrough and a spring biased movable retainer mounted in the body member operable to permit the cone lock to slide in a first direction with respect to the cable received therethrough and operable to block the cone lock from sliding opposite to the first direction, an engaging means being mounted on the spring biased movable retainer and accessible through the centered opening;

the removable release tool comprising:

a cylindrical handle portion having an axial bore therethrough with a handle mounted transversely thereto at a first end, with an engaging means at a second end;

a first and a second sleeve each having an axial boring therethrough joined by a longitudinal portion with said first sleeve having a first and a second end surface, said first and said second sleeves being joined by said longitudinal portion so as to have a common center line with respect to said interior borings with said first and said second end surfaces being substantially perpendicular thereto;

said cylindrical handle portion being rotatably mounted within said axial boring of said second sleeve;

whereby the cone lock may be released by positioned the cable clamped by the cone lock within said axial boring within said cylindrical handle portion, said engaging means engaging the spring biased movable retained within the cone lock and the spring biased movable retainer being moved opposite to the first direction, thereby releasing the cone lock, by rotating said cylindrical handle portion.

* * * * *